(12) United States Patent
Baker

(10) Patent No.: US 6,278,541 B1
(45) Date of Patent: Aug. 21, 2001

(54) SYSTEM FOR MODULATING A BEAM OF ELECTROMAGNETIC RADIATION

(75) Inventor: Brian John Baker, Buckinghamshire (GB)

(73) Assignee: Lasor Limited, Berkshire (GB)

( * ) Notice: Subject to any disclaimer, the term of this patent is extended or adjusted under 35 U.S.C. 154(b) by 0 days.

(21) Appl. No.: 09/341,377

(22) PCT Filed: Jan. 12, 1998

(86) PCT No.: PCT/GB98/00073

§ 371 Date: Sep. 9, 1999

§ 102(e) Date: Sep. 9, 1999

(87) PCT Pub. No.: WO98/30927

PCT Pub. Date: Jul. 16, 1998

(30) Foreign Application Priority Data

Jan. 10, 1997 (GB) ..................................... 9700472

(51) Int. Cl.$^7$ .................................................. G02B 26/00
(52) U.S. Cl. ............................................ 359/291; 359/295
(58) Field of Search ..................................... 359/290, 291, 359/293, 295, 296, 322, 238, 276

(56) References Cited

U.S. PATENT DOCUMENTS

| | | | |
|---|---|---|---|
| 3,443,098 | * | 5/1969 | Lewis et al. ........................... 359/291 |
| 3,602,577 | * | 8/1971 | Byram ................................... 359/291 |
| 4,165,155 | | 8/1979 | Gordon, II et al. .................. 350/285 |
| 4,441,791 | | 4/1984 | Hornbeck .............................. 350/360 |
| 4,571,603 | | 2/1986 | Hornbeck et al. .................... 346/160 |
| 5,132,723 | | 7/1992 | Gelbart .................................. 355/40 |
| 5,208,818 | | 5/1993 | Gelbart et al. ......................... 372/30 |
| 5,455,709 | | 10/1995 | Dula, III et al. ...................... 359/245 |
| 5,613,022 | * | 3/1997 | Odhner et al. .......................... 385/37 |
| 5,689,380 | | 11/1997 | Um ....................................... 359/846 |
| 5,777,781 | * | 7/1998 | Nam et al. ............................ 359/291 |

FOREIGN PATENT DOCUMENTS

| | | |
|---|---|---|
| 0 004 411 | 10/1979 | (EP) . |
| 0 013 179 | 7/1980 | (EP) . |
| 0 277 703 | 8/1988 | (EP) . |
| 0 743 541 | 11/1996 | (EP) . |
| 2 238 880 | 6/1991 | (GB) . |
| 2 265 024 | 1/1996 | (GB) . |

OTHER PUBLICATIONS

"Optical Beam Deflector Using a Piezoelectric Bimorph Actuator", by Tomio Ono, Sensors and Actuators A, vol. A22, No. 1, pp. 726–728, Mar. 1990.

"Transducer for Dynamic Optical Cavity Length or Focus Control", IBM Technical Disclosure Bulletin, vol. 36, No. 3, pp. 99–102, Mar. 1993.

"Optimizing Scanning Mirror System Performance Using Solid State Piezoelectric Actuators", by Michael G. Harris et al., Proceedings of the American Control Conference, San Diego, May 23–25, 1990, vol. 2, pp. 1302–1304.

* cited by examiner

*Primary Examiner*—Huy Mai
(74) *Attorney, Agent, or Firm*—Westman, Champlin & Kelly, P.A.

(57) ABSTRACT

An optical modulator comprises a body of deformable material having a state of strain which changes in response to an applied electric field. The body has a modulating surface for effecting the light modulation. Opposite ends of the body, with the modulating surface between the opposite ends, are held by holding means so that changes in the state of strain result in displacement of the modulating surface between first and second positions. Electric means are provided to apply an electric field to the body to effect light modulation.

20 Claims, 11 Drawing Sheets

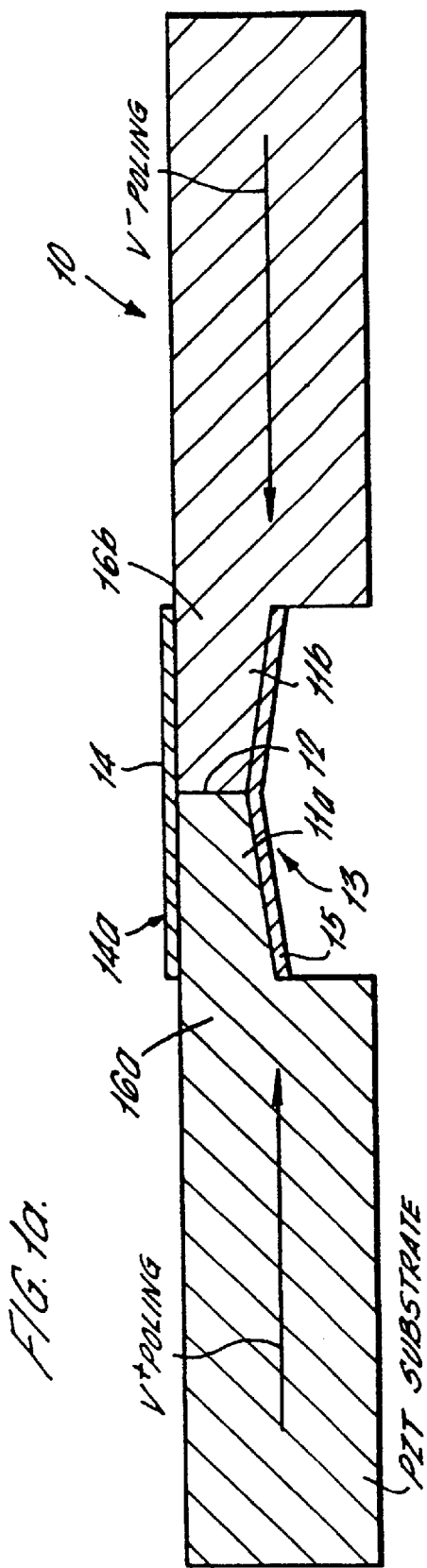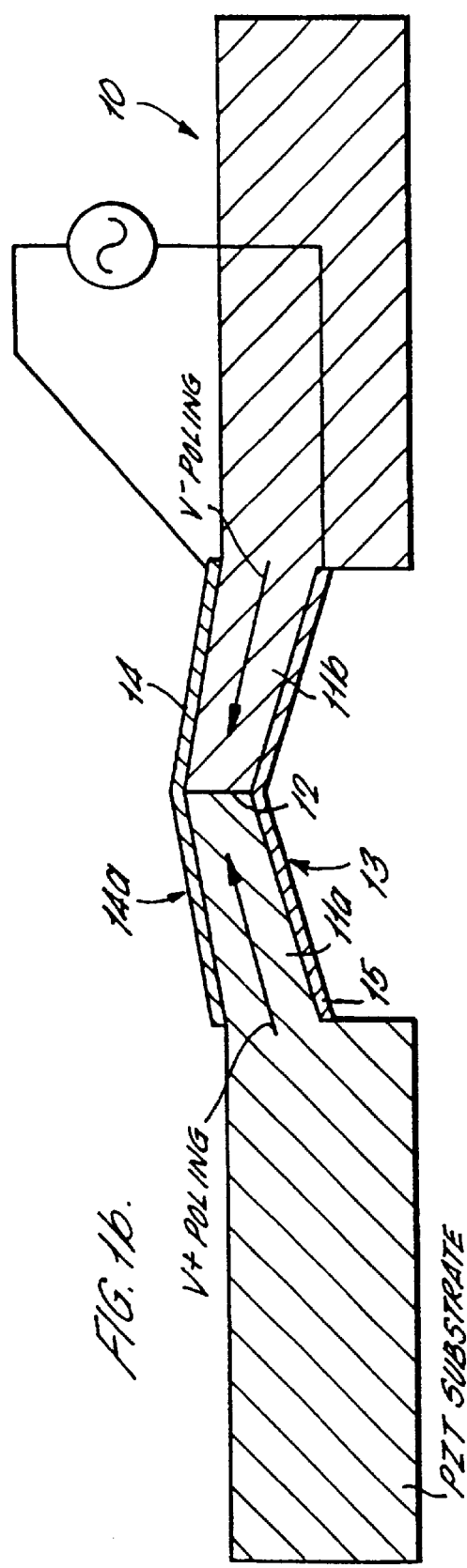

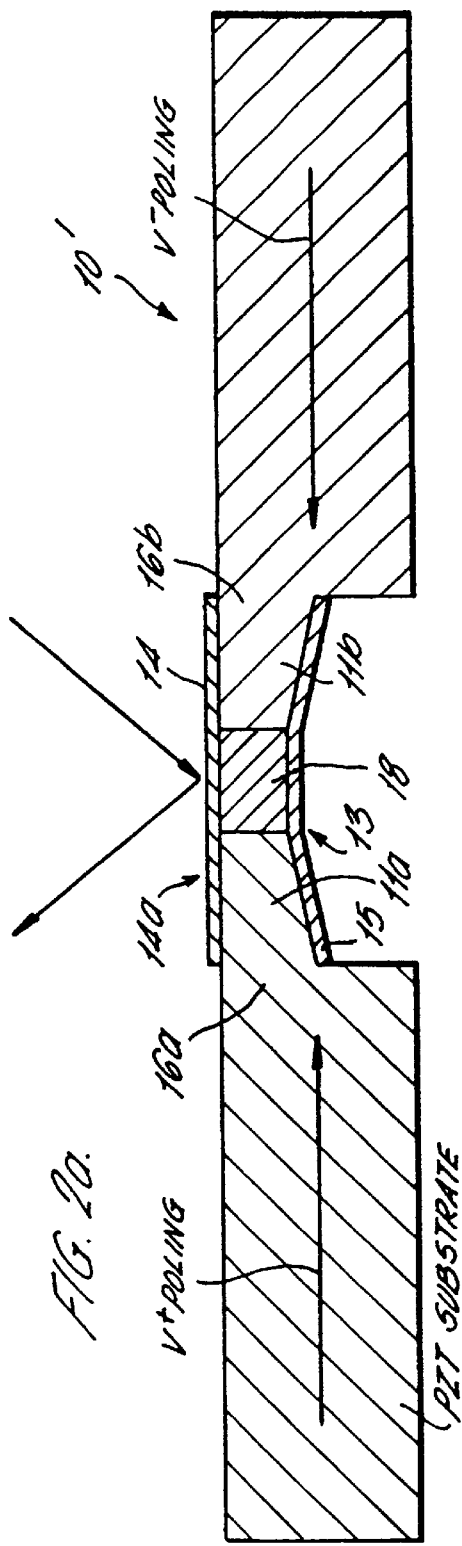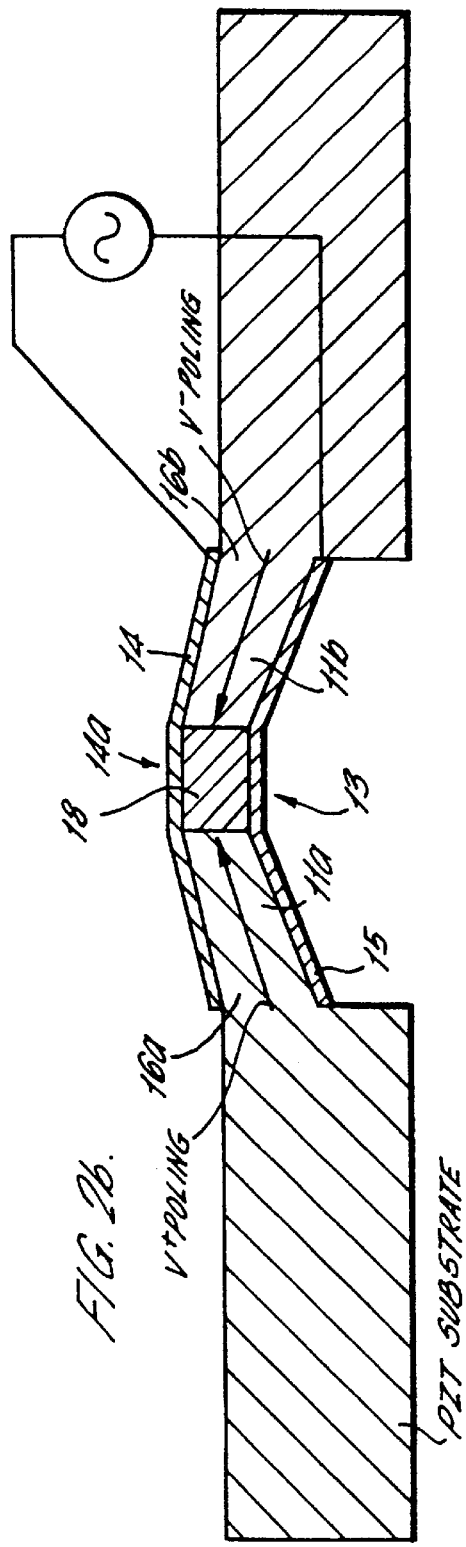

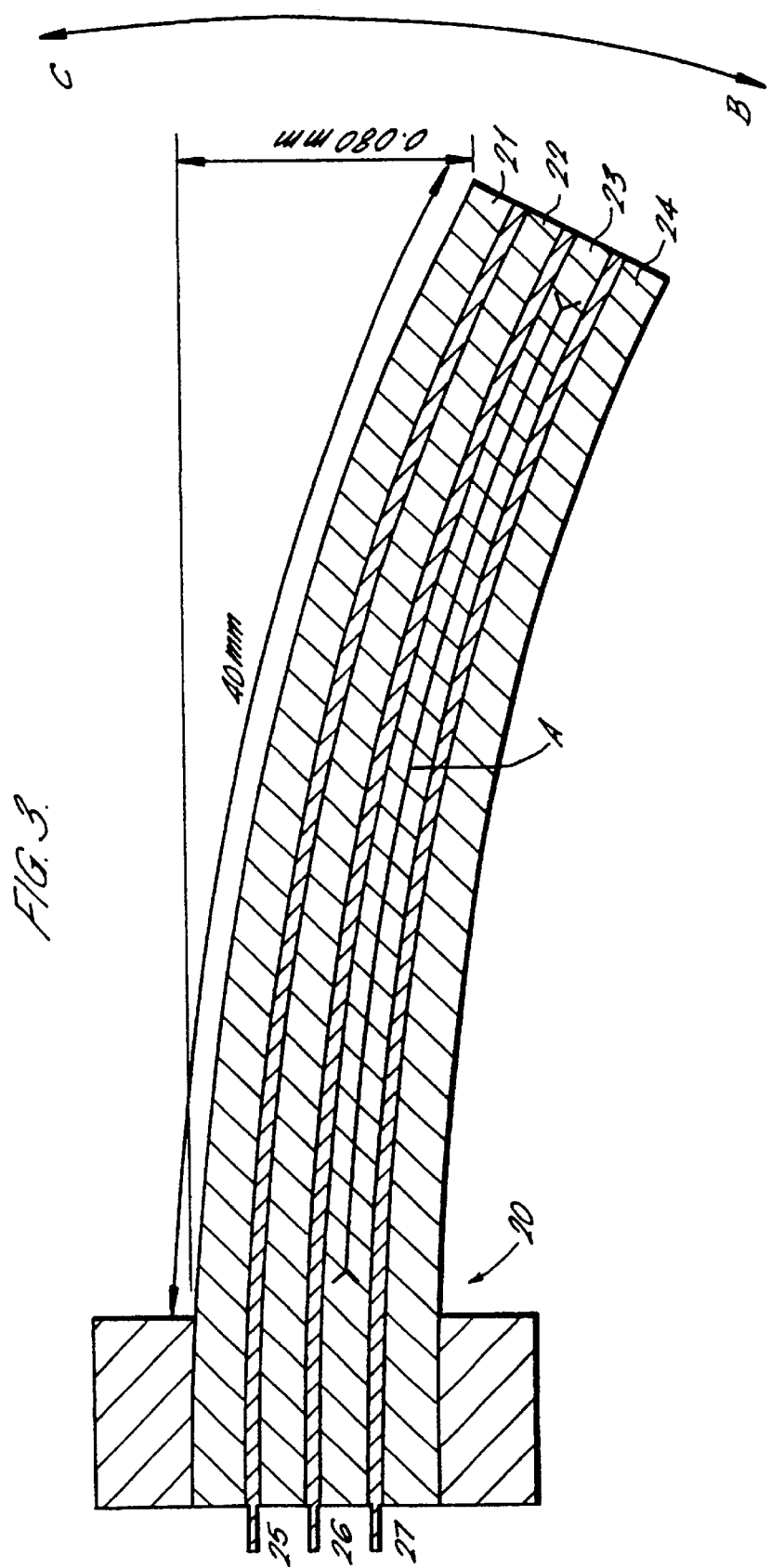

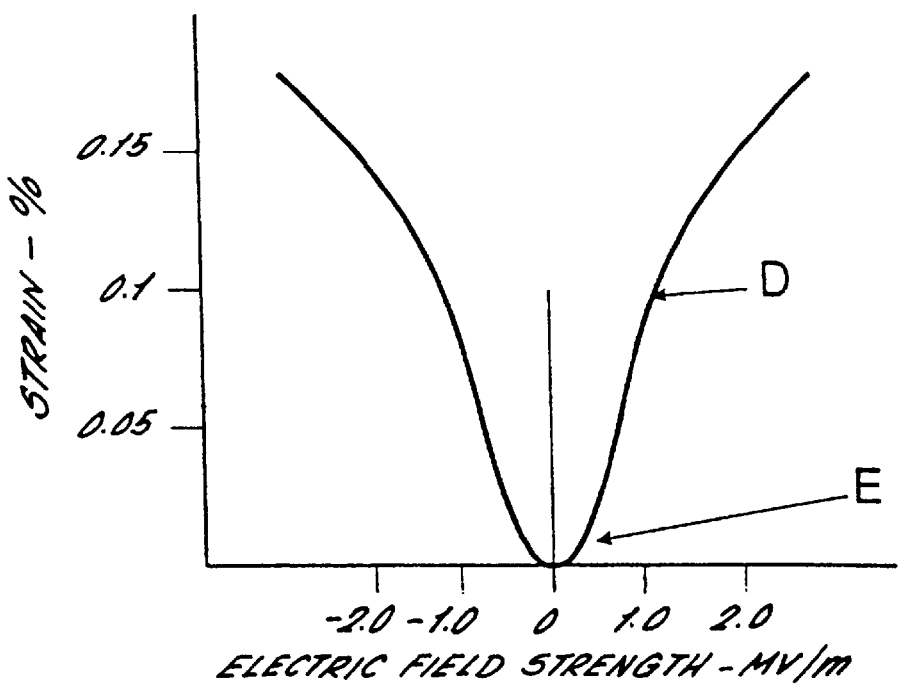

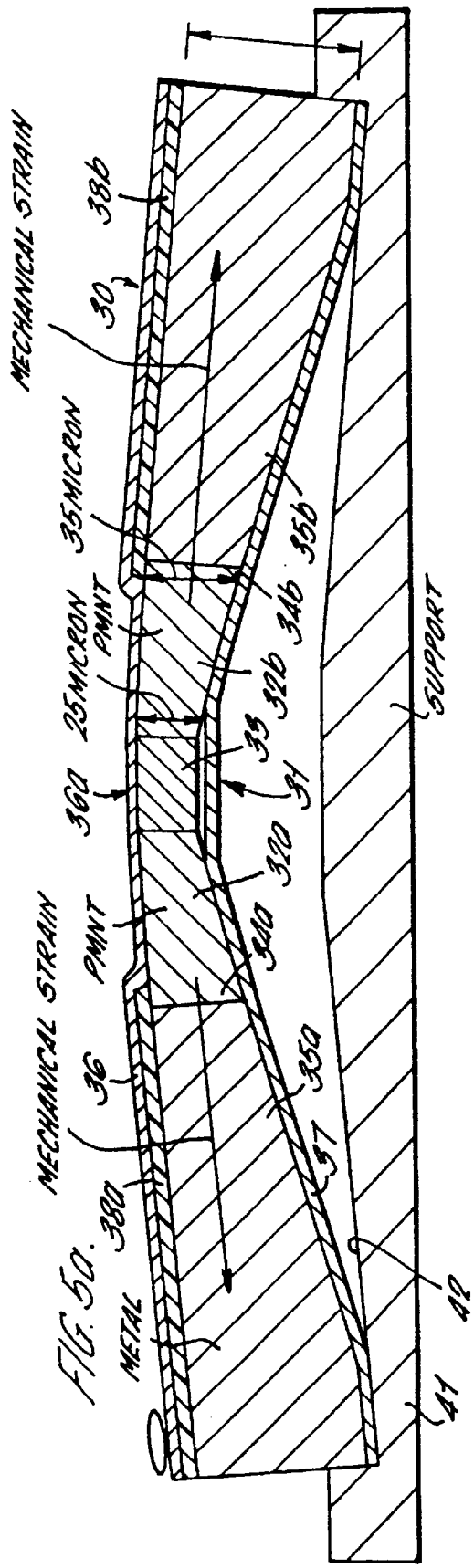
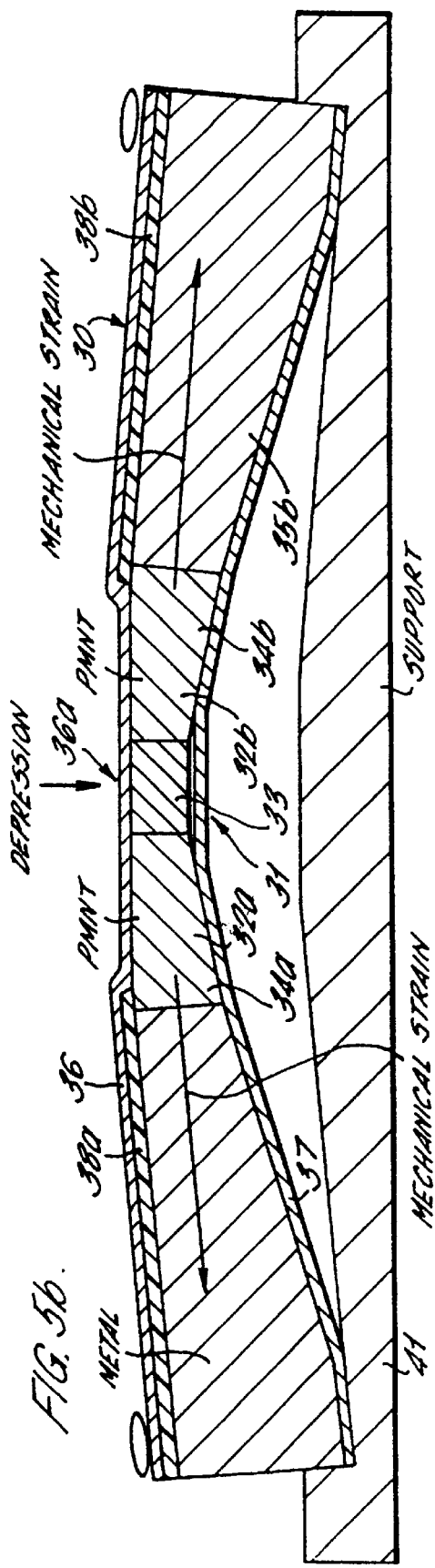

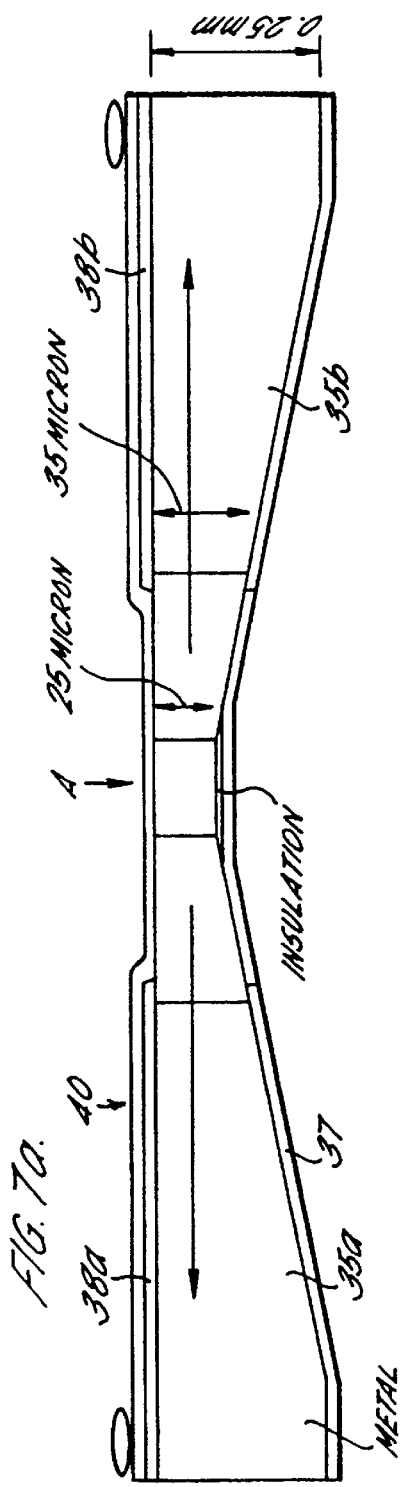
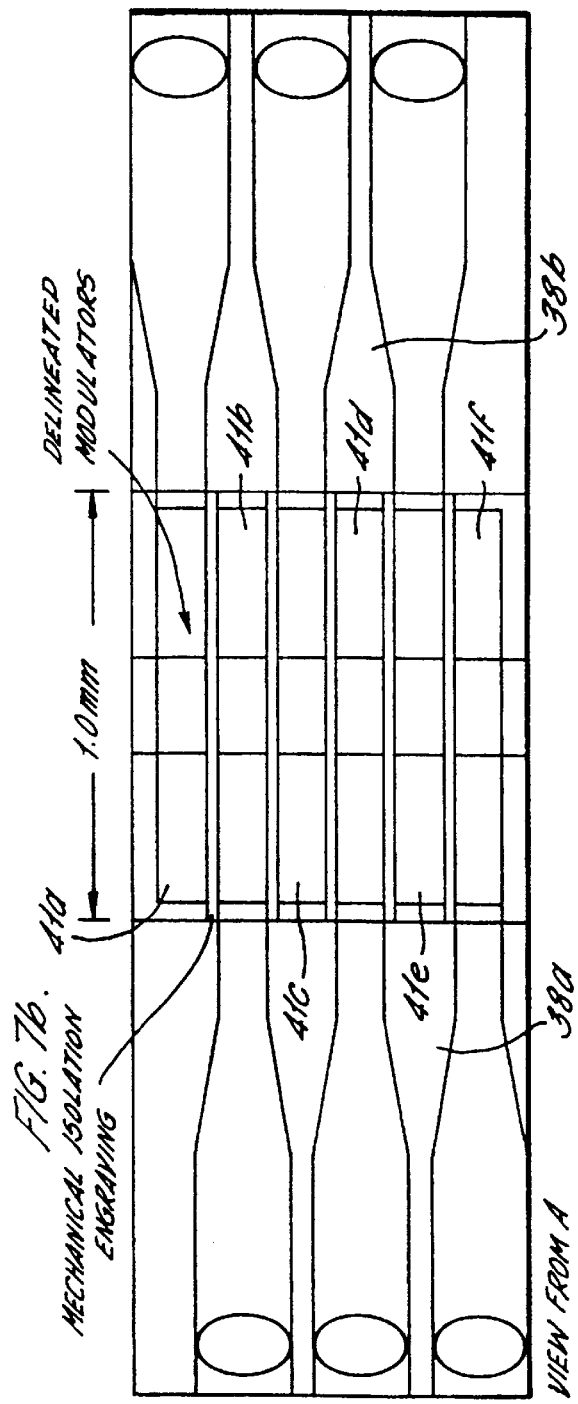

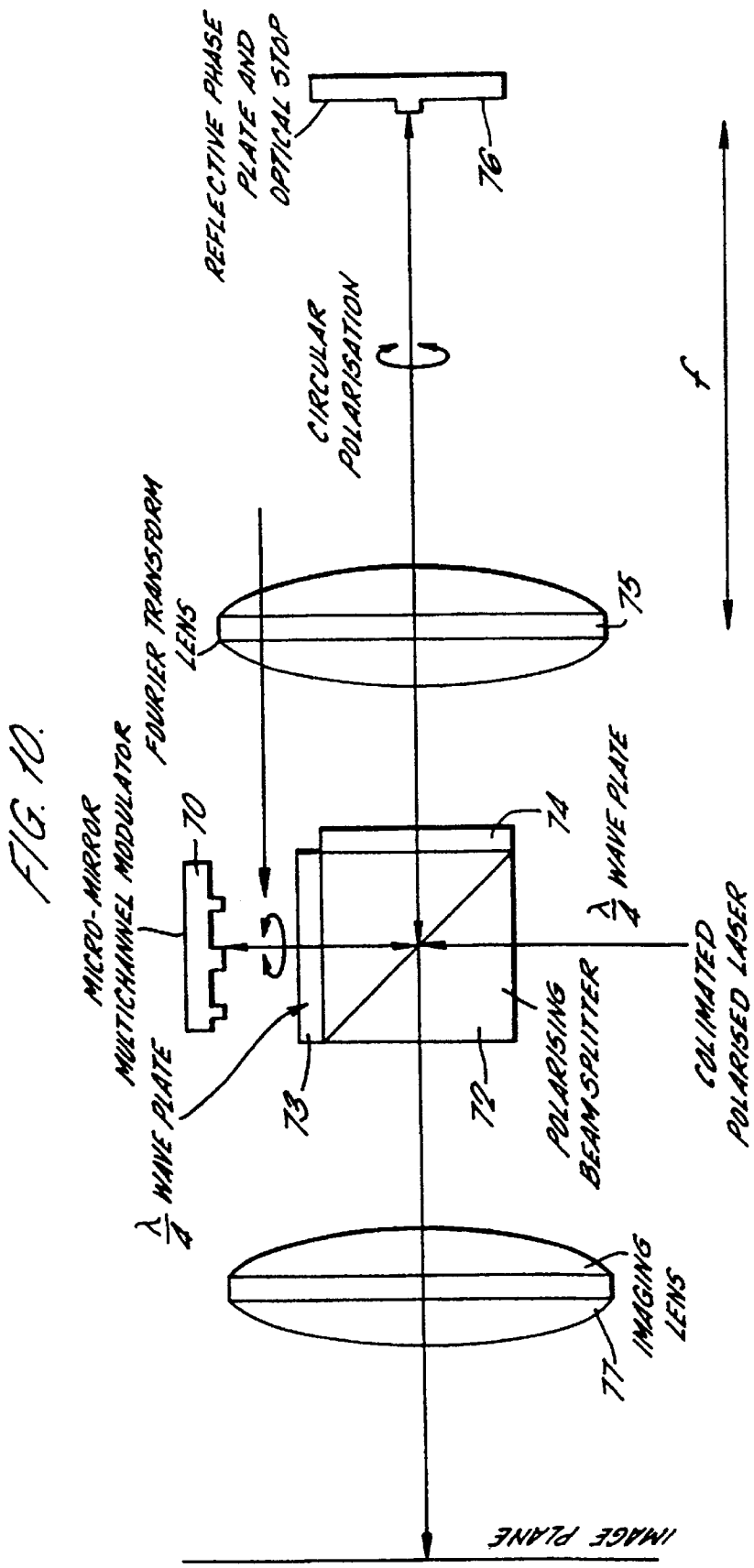

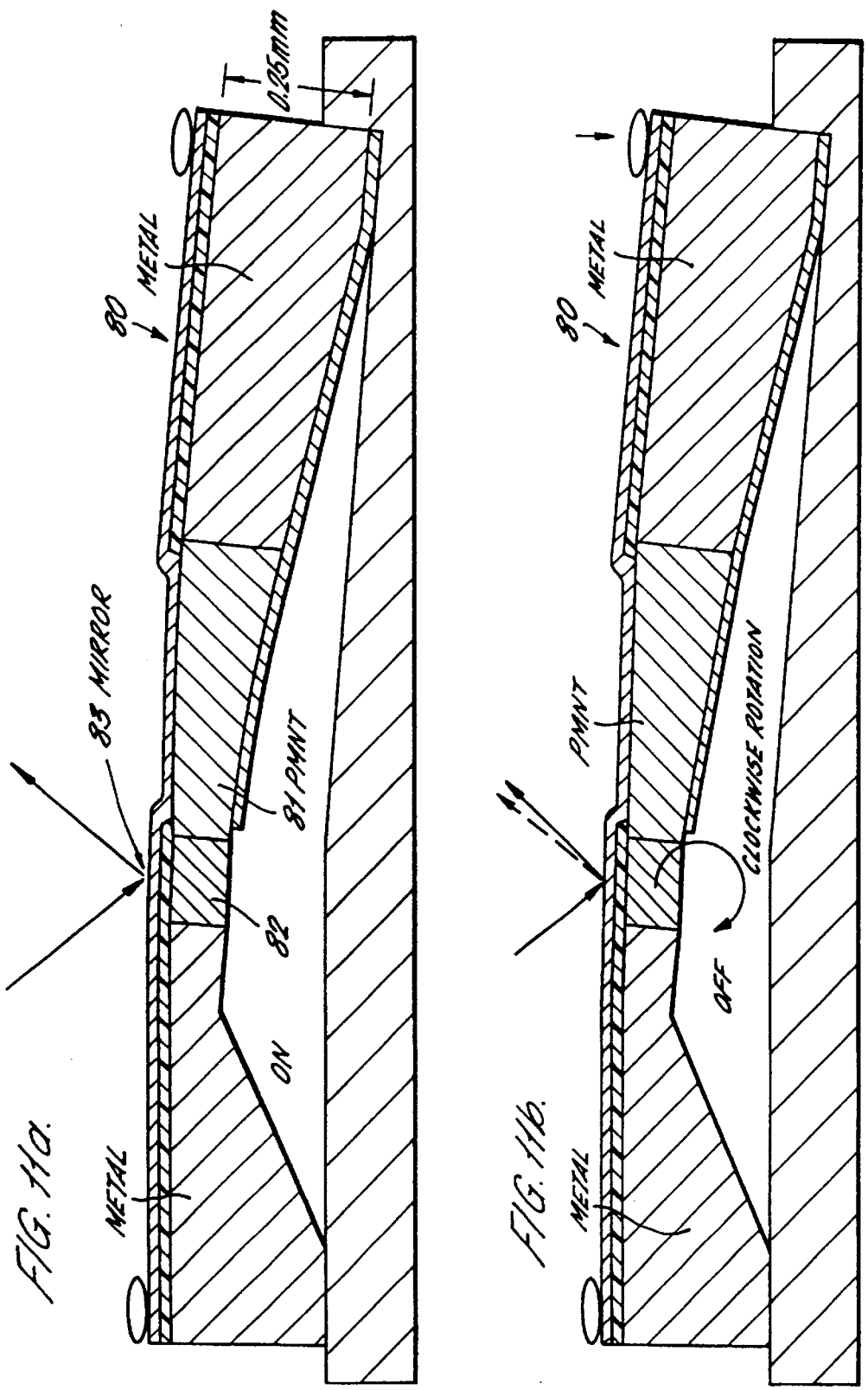

SYSTEM FOR MODULATING A BEAM OF ELECTROMAGNETIC RADIATION

The present invention relates to an optical device, and more particularly, to a device for modulating a beam of electromagnetic radiation.

BACKGROUND OF THE INVENTION

Modulation of high power lasers, using either acousto-optic or electro-optic systems, presents efficiency problems. With acousto-optic modulators, there is an inevitable trade off between switching rise time and diffraction efficiency. In other words the fastest data throughput is accompanied with the minimum optical efficiency. Electro-optic modulators, which predominantly rely on polarising optics can achieve optical efficiencies of approaching 50%.

Normal optical recording methods benefit from recording systems which are highly inefficient, with only a small percentage of the generated laser energy being used to expose the final image on film. With silver halide films or xerographic processes, where the required imaging sensitivity is of the order of 15–35 $mJ/M^2$, optical economies can be achieved by using optical systems which do not collect or image all of the energy generated. Thermal optical recording, however uses media which is energy intensive having sensitivities in excess of 100 $mJ/cm^2$. consequently more efficient optical systems, both imaging and modulation are required for this media, otherwise severe problems will be encountered both in the provision of a dump for the waste heat, and in economic penalties by requiring a much higher power laser than that just required for imaging the media.

Imagebars comprising a plurality of light gates present an alternative approach to imaging high resolution optical recording systems in pre-press environments. The traditional approach has been to use a segmented section in a sub raster scanning system, using either flat bed or external drum approaches. Previous methods have used electro-optic light gate arrays, based on PLZT, ferro-electric liquid crystal or magneto-optic switching systems.

There are a number of reflective optical systems which can be used for imagebar construction which result in a substantial improvement in optical throughput efficiency. The first, described by Hornbeck in U.S. Pat. No. 4,441,791 and illustrated in application to xerographic printing in U.S. Pat. No. 4,571,063, uses a silicon deformable mirror spatial light modulator. With these types of systems, the incident light is reflected onto is the imaging media or onto an optical stop.

U.S. Pat. No. 4,441,791 discloses a light modulator comprising a light-reflective metallized membrane defining a deformable mirror disposed over a semiconductor substrate of one conductivity type. A matrix of floating metallic field plate members is disposed on an insulating layer covering the substrate to define an array of air gap capacitors for line addressing by the field effect address transistors. The floating metallic field plates are opaque to light and prevent photocharge generation in the active regions of the matrix array of field effect address transistors. The metallized membrane is spaced from the field effect address transistors and the metallic floating field plates by an upstanding semiconductor grid structure which is formed on the insulating layer of the semiconductor substrate and defines gate electrodes for the address transistors. The metallized membrane is mounted on the upstanding semiconductor grip structure by molecular bonding to the contact members disposed over the semiconductor grid structure. The metallized membrane is formed of a polymer of nitrocellulose as a flexible carrier layer on at least one surface of which is disposed a thin metallic coating providing a light reflective surface. Each transistor in the array of field effect address transistors is line-addressable, and the metallized membrane in each cell of the matrix array of air gap capacitors is deflectable inwardly toward the substrate in response to the signal on the address transistor corresponding thereto. Should a potential above a predetermined magnitude be placed on an individual air gap capacitor, the metallized membrane will transfer charge to the floating field plate and return to zero deflection. The floating field plate thereby not only acts as a light-blocking layer, but also prevents voltage-induced collapse of the metallized membrane to the surface of the semiconductor substrate.

Various problems have arisen with deformable mirror spatial light modulators of the type disclosed in U.S. Pat. No. 4,441,791. In particular, problems have occurred due to pixel sticking, fracture or fatigue failure.

Furthermore, the angular tolerances required of the individual modulators in the switched state is very high, for such devices to be used in printing applications. The high angular movement also precludes their use in fast rise time applications. For printing, the rise time of the exposure should be less than one-third of the required exposure time, otherwise adjacent pixels will have non reciprocal exposure times. This requirement inevitably limits the printing bandwidth of these devices.

SUMMARY OF THE INVENTION

According to the present invention, there is provided a optical modulator comprising: a body of deformable material having a state of strain which changes in response to an applied electric field, said body having a modulating surface for effecting the light modulation;

holding means for holding opposite ends of said body with said modulating surface between said opposite ends so that changes in the state of strain result in displacement of said modulating surface between first and second positions;

and electric means for applying an electric field to said body.

The present invention provides greater control of the permitted displacement of said modulating surface because the opposite ends of said body of deformable material are held by the holding means.

Materials which have a state of strain which changes in response to an applied electric field can exhibit the property of electrostriction or the piezoelectric effect. Electrostriction is the change in the dimensions of a dielectric which accompanies the application of an electric field. In the piezoelectric effect, an applied electric field produces mechanical deformation in some anisotropic crystals—in such crystals, electric polarisation takes place when the crystals are subject to mechanical strain.

An advantage of using an electrostrictive material rather than a piezoelectric material is the greater efficiency of electrostrictive material when subject to an alternating electric field. Because of the switching of the electric polarization required when an alternating electric field is applied, energy is dissipated in the piezoelectric material at high frequencies of alternating electric field. This energy generates self-heating which in turn leads to depoling of the piezoelectric material.

Advantageously, said body comprises a layer of an electrostrictive material and a further layer of material fixed together. As the layer of electrostrictive material and the further layer are fixed together, changes in the length of the layer of electrostrictive material due to application of an electric field results in a deflection of the body to generate the displacement of the modulating surface.

Conveniently, the further layer is provided as an electrode layer forming part of the electric means.

In one embodiment, said further layer is formed of said electrostrictive material and said electric means is adapted to apply an electric field to said layer or said further layer. This embodiment has the advantage that the body, and hence the modulating surface, may be caused to deflect in one of two directions depending on the location of the layer of electrostrictive material to which an electric field is applied.

Most advantageously, the optical modulator using a layer of electrostrictive material comprises strain means for effecting a basic state of strain in the deformable material such that variations in the electric field applied to said body by said electric means effect variations in said state of strain about said basic state of strain.

Because of the variation between strain and applied electric field strength exhibited by electrostrictive materials, a great variation in displacement can be achieved for a given change in applied electric field.

Most conveniently, said strain means comprises mechanical means for applying a mechanical strain to said body. Said strain means may form part of said holding means. Alternatively, or in addition, said strain means may effect a basic state of strain in the deformable material by application of an electric field or by a change in temperature.

Advantageously, said electrostrictive material is lead titanate modified lead magnesium niobate (PMNT)

Alternatively, said body comprises at least one layer of a piezoelectric material exhibiting the piezoelectric effect.

Advantageously, said piezoelectric material is polycrystalline lead zirconium titanate (PZT).

To effect a substantially linear displacement of said modulating surface, said body of deformable material advantageously comprises first and second bodies of said deformable material joined together, the ends of said first and second bodies which are not joined together being said opposite ends of said body held by said holding means. For the embodiment using a piezoelectric material, said first and second bodies would be of opposing poles.

To provide a modulating surface of a reasonable size, the light modulator may further comprise an inactive body between said first and second bodies, said inactive body being electrically non-conductive and having a state of strain which substantially does not change in response to an applied electric field, said modulating surface being positioned adjacent said inactive body.

Alternatively, an angular deflection of said modulating surface may be produced by providing said modulating surface in an optical modulator having a single body of deformable material, said inactive body having a state of strain which substantially does not change its response to an applied electric field.

The present invention envisages the possibility of an optical modulator which is effective as an optical gate or an optical switch. Advantageously, the optical modulator comprises a plurality of optical modulators as hereinbefore outlined with respect to the present invention arranged in a plane with said displacement of a plurality of modulating surfaces being at an angle to said plane. Advantageously, said displacement is substantially normal to said plane.

The modulating surface may have a negative dielectric constant, preferably a negative dielectric constant of a magnitude greater than the magnitude of the dielectric constant of air or other medium adjacent the modulating surface. Conveniently, said modulating surface is a surface made of a metal such as silver.

Optical modulators having a negative dielectric constant as outlined above may be used in combination with a prism to provide an optical switch. Such an optical modulator makes use of the phenomenon of attenuated total reflection (ATR) in which surface plasmons can be excited by coupling the evanescent wave produced by the total internal reflection of an incident wavefront in a prism to the surface mode in a negative dielectric such as a metal. If the gap between the prism and the modulating surface of negative dielectric is too great, then there is no coupling and the incident wavefront is reflected from the internal surface of the prism. However, if the gap between the prism and the modulating surface is reduced sufficiently, then the evanescent wave is absorbed by the modulating surface to generate the surface plasmons described above and so no wave is reflected from the prism.

In another embodiment, the modulating surface is a reflective surface.

A further aspect of the present invention therefore provides a phase contrast generator comprising a plurality of light modulators according to said first aspect of the present invention in which said modulating surface of each individual light modulator is a reflective surface.

BRIEF DESCRIPTION OF THE DRAWINGS

The present invention will now be described, by way of example only, and with reference to the accompanying drawings in which:

FIG. 1a shows schematically a first embodiment of the present invention;

FIG. 1b shows schematically the deformation generated in the embodiment of FIG. 1a when an electric field is applied thereto;

FIG. 2a shows schematically a second embodiment of the present invention;

FIG. 2b shows the deformation generated in the embodiment of FIG. 2a when an electric field is applied thereto;

FIG. 3 illustrates the deformation which can be generated in a body of deformable material including an electrostrictive material;

FIG. 4 is a graph of strain against field strength for a typical electrostrictive material;

FIGS. 5a and 5b show a third embodiment of the present invention respectively in first and second positions;

FIG. 6b is a plan view of FIG. 6a;

FIG. 7a is a side view of the structure of FIG. 6a after machining;

FIG. 7b is a plan view of FIG. 7a;

FIG. 10 shows an optical system incorporating an embodiment of the present invention; and FIGS. 11a and 11b show a fourth embodiment of the present invention in on and off state.

DETAILED DESCRIPTION

Figure 6A:
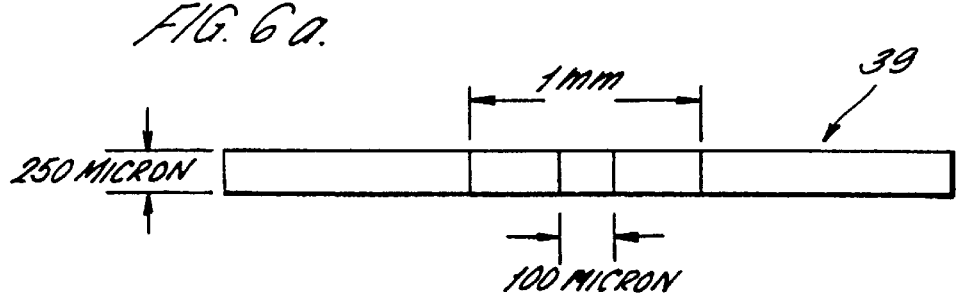
FIG. 6a shows schematically a side view of a sandwich structure of material used to make the embodiment of FIGS. 5a and 5b.

FIG. 1a shows a first optical modulator 10 made of piezoelectric material such as polycrystalline lead zirconium titanic (PZT). Commercially available forms of piezoelectric material such as Motorola D3203 are readily available. First and second arms 11a, 11b of piezoelectric material of opposing poles are joined together at a common interface 12 to form a beam 13. First and second electrode layers 14, 15 extend across the beam 13 so that an electric field can be applied across the beam 13. At least one of the electrode layers 14, 15 is made of a material having an outer surface 14a which is effective to modulate electromagnetic radiation. The ends of the first and second arms 11a, 11b remote from the common interface 12 are fixed or held by the remainder of the optical modulator 10 so that they do not move when an electric field is applied across the beam 13 by the electrode layers.

Shear mode deflection in piezoelectric materials is well known. FIG. 1b shows deformation of the beam 13 when an electric field is applied. Shear is a type or deformation in which parallel planes in a body remain parallel but are relatively displaced in a direction parallel to themselves. In the embodiment of FIGS. 1a and 1b, the planes in the beam 13 moving parallel to one another are perpendicular to the plane of the paper and substantially parallel to the common interface 12. Because the first and second arms 11a, 11b are of opposite poles, the tendency would be for the first and second arms 11a, 11b to rotate in opposite senses about the fixed ends 16a, 16b of the arms when the common electric field is applied across the electrode layers 14, 15. However, the first and second arms 11a, 11b also have a common interface 12 and so the resulting deformation is the Chevron shown in FIG. 1b. Thus, it can be seen that the modulating surface 14a has been displaced from the first position shown in FIG. 1a to the second position shown in FIG. 1b on application of an electric field.

FIGS. 2a and 2b relate to a modification 10' of the optical modulator 10 of FIGS. 1a and 1b. For ease of reference, like parts have been designated by like reference numerals. The optical modulator 10' differs from the optical modulator 10 in that a spacer 18 is provided to join the first and second beams 11a, 11b together. The spacer 18 is made of a material which substantially does not deform when an electric field is applied thereacross. Thus, as shown in FIG. 2b, the spacer 18 remains substantially the same shape in the presence or absence of an applied electric field. However, because the first and second arms 11a, 11b are deformed by application of the electric field, the spacer 18 is displaced from the first position shown in FIG. 2a to the second position shown in FIG. 2b. It will be appreciated that if the first and second arms 11a, 11b are identical, apart from being of opposite poles, the spacer 18 is provided equidistant between the fixed end 16a, 16b and so displaced linearly (rather than being rotated) when an electric field is applied.

Thus, the embodiment of FIGS. 2a and 2b can provide an optical modulator 10' in which a modulating surface 14a is displaced linearly by application of an electric field. Those skilled in the art will appreciate the advantages of providing linear displacement rather than rotational displacement of a modulating surface.

A problem arises with structures using piezoelectric materials in self-heating at high frequencies leading to depoling and loss of piezoelectric activity. Consequently, for high frequency operation, it is preferable to use an electrostrictive material to form the beam. Because shear mode operation of an electrostrictive material such as lead titanic modified lead magnesium niobate (PMNT) produces minimal displacement, a different principle of deformation is used as described below with respect to FIG. 3.

FIG. 3 shows a multilayer construction 20 comprising first, second, third and fourth layers 21, 22, 23, 24 of electrostrictive material interleaved by first, second and third electrodes 25, 26, 27. All of the layers are fixed together so that they cannot move independently of each other. When an electric field is applied across third layer 23 of electrostrictive material using second and third electrode layers 26, 27, a strain is generated which increases the thickness of the third layer 23 and thus generates a Poisson contraction along its length as indicated by the arrow A. Because the third layer 23 is fixed to the adjoining layers, contraction of the third layer 23 along its length causes the multilayer beam to deflect in the direction shown in FIG. 3 as indicated by the arrowhead B. Similarly, application of an electric field across the second layer 22 using first and second electrode layers 25, 26 causes the multilayer structure 20 to bow in the other direction as indicated by the arrow head C.

For thicknesses of PMNT of about 50 microns and ink electrode layers of 5 microns, a deflection of 0.08 mm is generated in a multilayer structure 20 of 40 mm length by a voltage field strength of 1.5 MV/m.

It will be appreciated that the provision of many layers in the multilayer structure 20 increases the stiffness of the multilayer structure 20 and so reduces the magnitude of deflection which can be generated by application of an electric field. Thus, for most applications, the number of layers will be reduced to the minimum possible. For deflection in both directions, as described above, it is only necessary to provide two layers of electrostrictive material together with the three electrode layers shown. If deflection in only one direction is required, then only two of the electrode layers are necessary. Furthermore, it is possible that the stiffness of the electrode layers may be sufficient to cause the layer of electrostrictive material to deflect rather than contract without the provision of further layers of electrostrictive material as shown.

FIG. 4 shows a graph of the electric field strength for a typical electrostrictive material such as PMNT. It can be seen that at low field strengths, the change in strain produced by a change in field strength of, say, 0.3 MV/m is less than the change in strain produced by the same charge in field strength when the total field strength is greater. Thus, it is more efficient to operate an electrostrictive material in the area of the graph indicated by the arrow D than in the area of the graph indicated by the arrow E. Operation of the electrostrictive material in the region of the graph indicated by the arrow D is operation in the "differential plus linear strained" mode which will be referred to as the Super Strained state. Rather than allowing the electrostrictive material to be totally relaxed for no deflection of a device, a basic state of strain is generated in the electrostrictive material for the null position of the device. This basic state of strain may be generated by mechanical means, electrical means or thermal means or, indeed, by any combination of these means.

As an example, consider a 1.0 mm beam for which a ±2 degree deflection generates a radius of curvature of 14.3 mm, with a centre chord deflection of ≈9 µm. A reduction of 1 µm can be generated by strain reduction $\Delta\zeta_1$ of 0.005%, which in turn is generated by a transverse strain increase $\Delta\zeta_t$ of 0.017%. In the Super Strained State this increase is generated by a Field Strength Differential of 0.15 MV/m, which for the dimensions given equates to 5 V. Applying an uniactive oscillating voltage causes the middle mirror section to oscillate vertically.

FIGS. 5a and 5b show an optical modulator 30 in which the electrostrictive material PMNT and the device operates according to the principles described with respect to FIGS. 3 and 4 above. The modulator 30 comprises a beam 31 formed by first and second arms 32a, 32b of PMNT joined together by a spacer 33. The ends of the arms remote from the spacer 33 are fixed to supports 35a, 35b. Typically, the supports 35a, 35b are made of a material such as sintered metal or sintered aluminium nitride which is effective as a heat sink. First and second electrode layers 36, 37 are provided so that an electric field can be applied across the first and second arms 32a, 32b of PMNT. Layers 38a, 38b of electrical insulation separate the electrode layer 36 from the supports 35a, 35b.

Figure 6B:
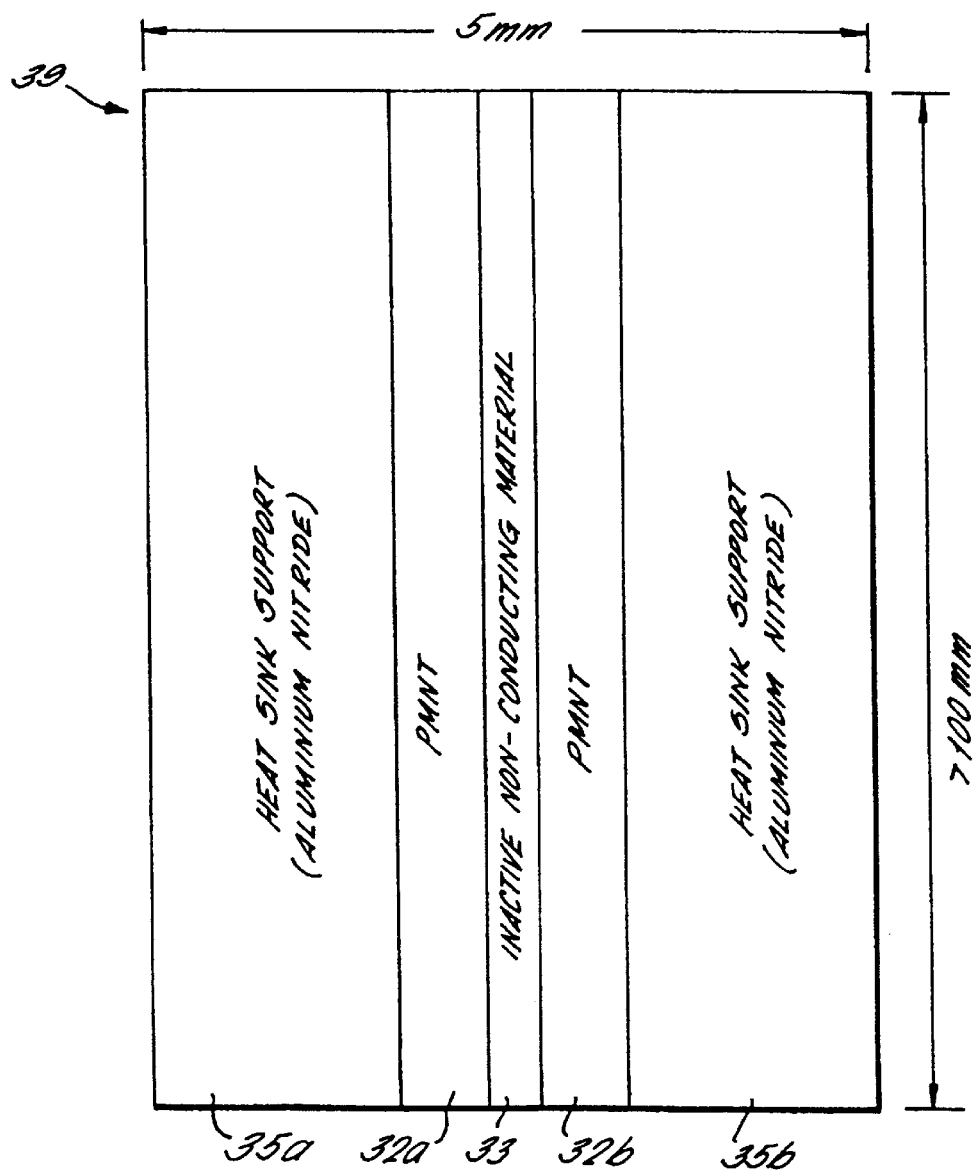

As can be best seen in FIGS. 6a and 6b, the optical modulator 30 is formed from a sandwich structure 39 of aluminium nitride, PMNT and a thin inactive non-conducting layer which provides the spacer 33. This basic structure is then diamond-machined to form the cross-section 40 shown in FIG. 7a. In the structure shown in FIG. 7a, the PMNT is not deformed and so has zero strain. To generate a basic state of strain in the PMNT, the machined structure 40 of FIG. 7a is fixed into a clip support 41 (shown in FIGS. 5a and 5b) having a cavity 42 which is shorter than the length of the structure 40.

As previously described, a structure comprising a layer of PMNT intermediate first and second electrode layers can be caused to deflect on application of an electric field. Thus, application of an electric field to the structure shown in FIGS. 5a and 5b will cause the modulating surface 36a to be linearly displaced in a similar manner to that described with respect to FIGS. 2a and 2b.

FIG. 6b is a plan view of the sandwich structure of FIG. 6a which can be used to make an optical modulator system comprising a plurality of optical modulators, each optical modulator having an individually displaceable modulating surface. FIG. 7b shows how a plurality of modulators may be delineated in a composite structure. As already described, the sandwich block 39 of FIGS. 6a and 6b is machined to produce the cross-section 40 shown in FIG. 7a. A common electrode layer 37 is provided on the underside of the machined block 40 for all of the modulators in the composite structure. Delineation into the plurality of modulators is therefore provided by the electrode layers on the upper surface of the composite structure. Layers 38a, 38b of electrical insulation are provided above the heat sink supports 35a, 35b. Individual electrode layers 41a, 41b, 41c, 41d, 41e, 41f extend across the beam 31 comprising the first and second arms 32a, 32b of PMNT and the spacer 33. Conveniently, for ease of construction, electrical connection to the individual electrode layers 41a to 41f is made from alternating sides as indicated in FIG. 7b. Conveniently, the individual electrode layers are applied as a single electrode layer which is then delineated using laser-assisted chemical etching. When the individual electrode layers have been formed, then deformation of any section of the PMNT will be controlled by the adjacent individual electrode layer 41a to f. In this way, a plurality of light modulators can be generated from a single sandwich construction.

Embodiments of the present invention therefore provide optical modulators having a modulating surface which can be displaced or deflected on application of an electric field. The optical modulators can therefore be switched electrically to modulate electromagnetic radiation incident thereon by deflecting the electromagnetic radiation. The optical modulators may also be used in optical devices to modulate electromagnetic radiation incident on the optical devices using a number of phenomena such as "attenuated total reflection" and phase contrast optics.

Figure 8A:
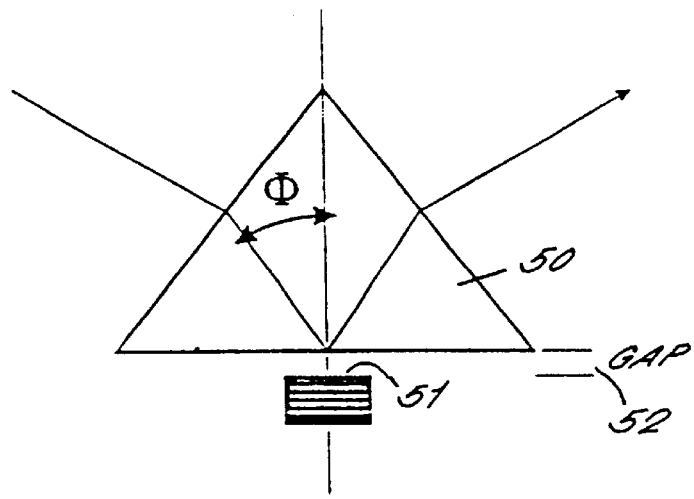
FIGS. 8a and 8b illustrate the principle of operation of an optical switch which may incorporate embodiments of the present invention.
Figure 8B:
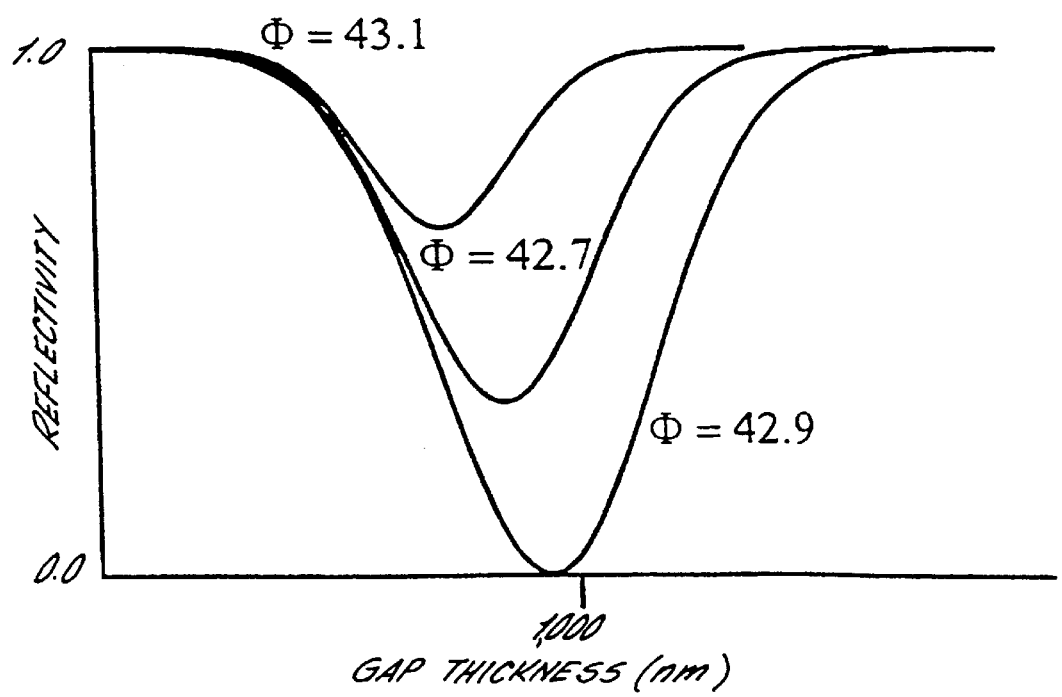

FIGS. 8a and 8b illustrate the principle of attenuated total reflection. A prism 50 is separated from a surface 51 by a gap 52. The gap 52 is filled with a medium having a dielectric constant less than the dielectric constant of the prism 50. The surface 51 is made of a material which has a negative dielectric constant whose magnitude is greater than the magnitude of the dielectric constant of the medium in the gap 52. In such circumstances, surface plasmons could be excited by coupling the evanescent way produced by the total internal reflection of an incident wavefront in the prism 50 to the surface mode of the negative dielectric 51 if the gap 52 is sufficiently small. Thus, if the gap 52 is sufficiently small, the energy in the incident wavefront is coupled to the surface plasmons and so no wavefront is reflected from the prism. In contrast, if the gap 52 is sufficiently large, then no coupling occurs and so the wavefront incident on the prism 50 is internally reflected out of the prism 50.

FIG. 8b shows a graph of reflectivity from the internal surface of the prism 50 with thickness of gap 52 for different angles of incident light.

Figure 9A:
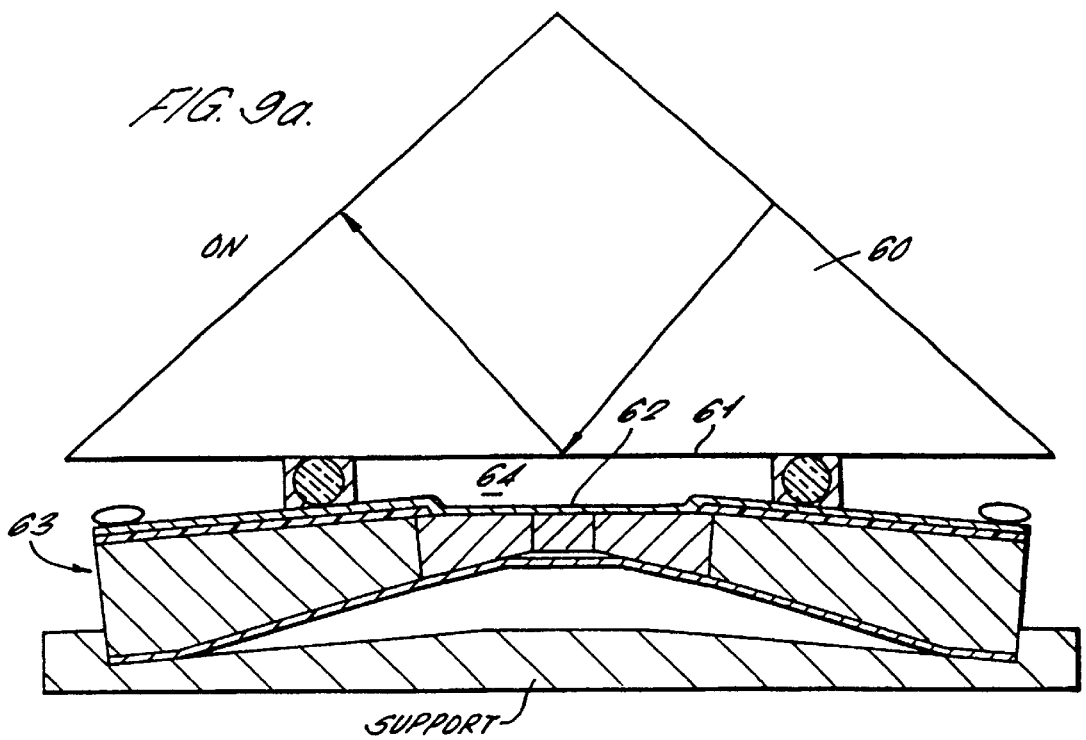
FIGS. 9a and 9b show an optical switch incorporating an embodiment of the present invention in the on and off state.
Figure 9B:
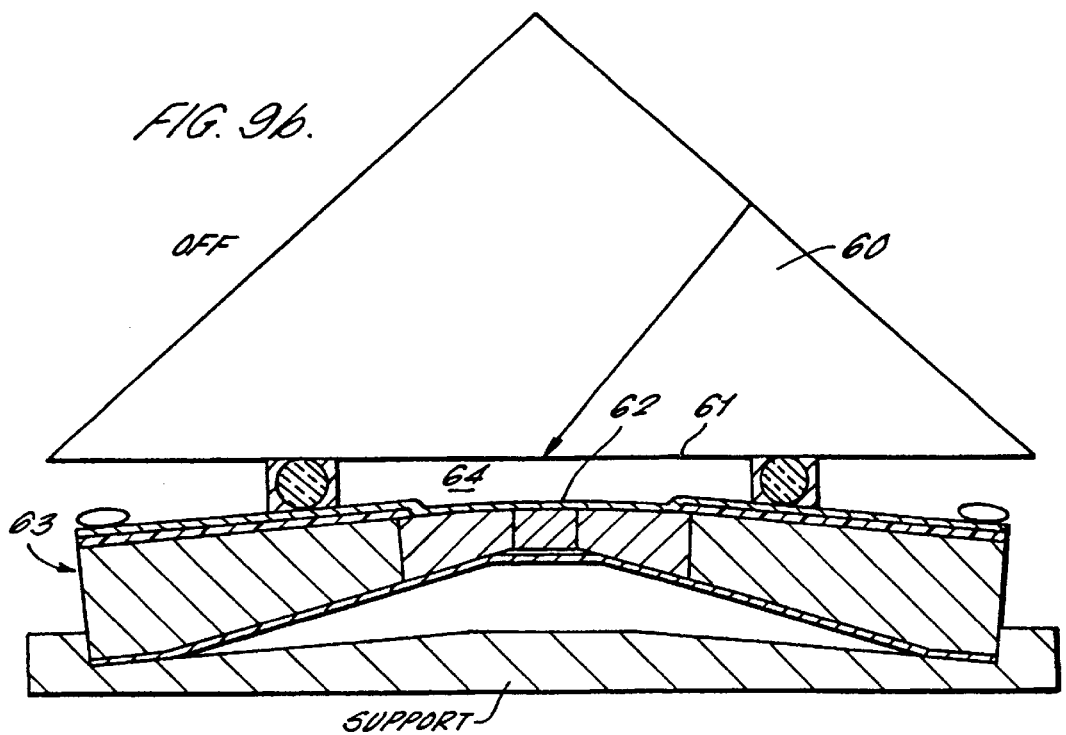

FIGS. 9a and 9b show an optical switch using the principle of attenuated total reflection and incorporating an optical modulator according to an embodiment of the present invention. A prism 60 having an internal reflecting surface 61 is separated from the modulating surface 62 of an optical modulator 63 by a gap 64. The optical modulator 63 may be provided in accordance with any of the embodiments previously described with a modulating surface 62 having a dielectric constant as described above with respect to FIG. 8a. The prism 60 is separated from the optical modulator by a glass bead spacer 65. When the gap between the modulating surface 62 and internal surface 61 of the prism 60 is sufficiently large, then light incident on the prism 60 is reflected at the internal surface 61 and reflected out of the prism 60. In this situation, the optical switch can be said to be "on". The optical switch is switched off as shown in FIG. 9b by applying an electric field so that the modulating surface 62 moves closer towards the internal surface 61 of the prism 60 and reduces the size of the gap. As already described, when the gap between the internal surface 61 of the prism 60 and the modulating surface 62 of the optical modulator 63 is sufficiently small, then light incident on the internal surface 61 is absorbed and not reflected.

FIG. 10 shows an optical device using the principle of phase contrast optics. An optical modulator system 70 comprises a plurality of optical modulators with the modulating surfaces being in the same plane. The modulating surfaces are individually controllable and linearly displaceable at an angle to this plane, most conveniently in a direction normal to the plane. The optical modulator 70 is therefore effective as a phase contrast generator. Collimated polarised laser radiation is input to a polarising beam splitter 72 and passed through a ¼ wave plate 73 which converts the radiation into a right-hand circularly polarised state. This light is incident on the phase contrast generator 70 and selectively reflected as left-hand polarised light. The reflected light is converted by passage through the ¼ wave plate 73 into a linearly polarised state, reflected by the polarising beam splitter 72 and passed through another ¼ wave plate 74 which converts the linearly polarised light into circularly polarised light. The circular polarised light is collected by a Fourier transform lens 75 and selectively filtered by a reflective phase/stop plate 76 so that zeroth order radiation is removed.

The reflected filtered orders are again collected by the Fourier transform lens 75 as circular polarised radiation, converted to linearly polarised radiation by the ¼ wave plate 74 and passed straight through the polarising beam splitter 72 to be collected and imaged onto a final image plane by an imaging lens 77.

The reflective phase/stop plate can be designed such that higher orders than the zeroth are removed, but in such circumstances, the phase contrast generator 70 is programmed and arranged to generate multiple complementary phase fronts which sum to the required intensity in the image plane.

FIGS. 11*a* and 11*b* show a further embodiment of an optical modulator 80. The optical modulator 80 is similar to the embodiments already described but comprises only a single arm 81 of deformable material. Such an optical modulator 80 may be manufactured specifically by using only one arm of PMNT. Alternatively, a sandwich construction having first and second arms of PMNT may be modified by diffusing platinum into one of the arms. As only one arm 81 of PMNT is provided, the spacer 82 is caused to rotate when subjected to an electric field. As previously described, in use, the device is arranged such that the PMNT is subjected to both radial and linear strain and so operates in the superstrained state. A modulating surface 83 provided adjacent the spacer 82 is therefore caused to rotate. Light incident on the modulating surface 82 is caused to deflect by an angle equal to twice the angular rotation of the mirror 82.

What is claimed is:

1. An optical modulator comprising: a body of deformable material having a state of strain which changes in response to an applied electric field, said body having a modulating surface for effecting the light modulation and comprising at least one layer of an electrostrictive material having the property of electrostriction;

supports for holding opposite ends of said body with said modulating surface between said opposite ends so that changes in the state of strain result in displacement of said modulating surface between first and second positions; and an electric field generator for applying an electric field to said body.

2. An optical modulator according to claim 1 in which said body comprises a layer of an electrostrictive material and a further layer of material fixed together.

3. An optical modulator according to claim 2 in which said further layer is provided as an electrode layer forming part of the electric field generator.

4. An otpical modulator according to claim 2 in which said further layer is formed of said electrostrictive material and said electric field generator is adapted to apply an electric field to said layer or said further layer.

5. An optical modulator according to claim 1, further comprising strain means for effecting a basic state of strain in the deformable material such that variations in the electric field applied to said body by said electric field generator effect variations in said state of strain about said basic state of strain.

6. An optical modulator according to claim 5 in which said strain means comprises mechanical means for applying a mechanical strain to said body.

7. An optical modulator according to claim 6 in which said strain means forms part of said support.

8. An optical modulator according to claim 1 in which said electrostrictive material is lead titanate modified lead magnesium niobate (PMNT).

9. An optical modulator according to claim 1 in which said body of deformable material comprises first and second bodies of said deformable material joined together, the ends of said first and second bodies which are not joined together being said opposite ends of said body held by said support.

10. An optical modulator according to claim 9 further comprising an inactive body between said first and second bodies, said inactive body being electrically non-conductive and having a state of strain which substantially does not change in response to an applied electric field, said modulating surface being positioned adjacent said inactive body.

11. An optical modulator system comprising a plurality of optical modulators according to claim 1 arranged in a plane with said displacement being at an angle to said plane.

12. An optical modulator according to claim 11 in which said displacement is substantially normal to said plane.

13. The optical modulator system according to claim 11 in which said modulating surface of each optical modulator includes a reflective surface and wherein the system utilizes phase contrast optics.

14. An optical modulator according to claim 1 which said modulating surface has a negative dielectric constant.

15. An optical modulator according to claim 14 in which said modulating surface has a negative dielectric constant of a magnitude greater than the is magnitude of the dielectric constant of air.

16. An optical modulator according to claim 15 in which said modulating surface is a metal surface.

17. An optical modulator according to claim 16 in which said metal is silver.

18. An optical modulator according to claim 14 further comprising a prism of optically transparent material having a prism surface separated from said modulating surface by a gap, the gap being filled with a medium having a dielectric constant of magnitude less than the dielectric constant of the modulating system and the dielectric constant of the prism.

19. An optical modulator according to claim 1 in which said modulating surface is a reflective surface.

20. An optical modulator according to claim 1 in which said body is provided as a single body of deformable material and said displacement is angular.

* * * * *

UNITED STATES PATENT AND TRADEMARK OFFICE
CERTIFICATE OF CORRECTION

PATENT NO.    : 6,278,541 B1
DATED         : August 21, 2001
INVENTOR(S)   : Brian J. Baker It is certified that error appears in the above-identified patent and that said Letters Patent is hereby corrected as shown below:

<u>Column 10,</u>
Line 38, cancel "is".

Signed and Sealed this

Twenty-sixth Day of March, 2002

Attest:

*Attesting Officer*

JAMES E. ROGAN
*Director of the United States Patent and Trademark Office*